United States Patent Office 2,712,298
Patented July 5, 1955

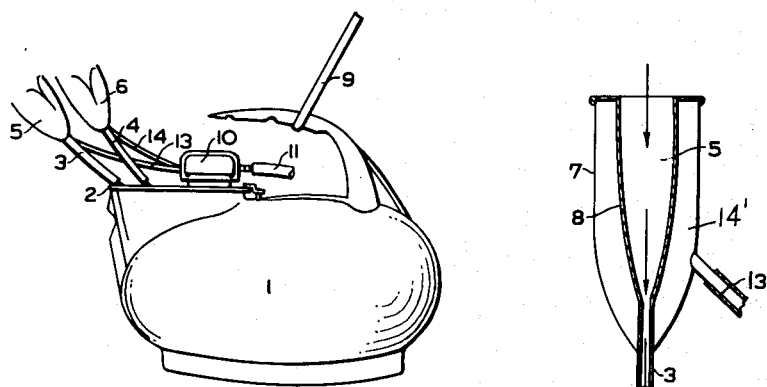
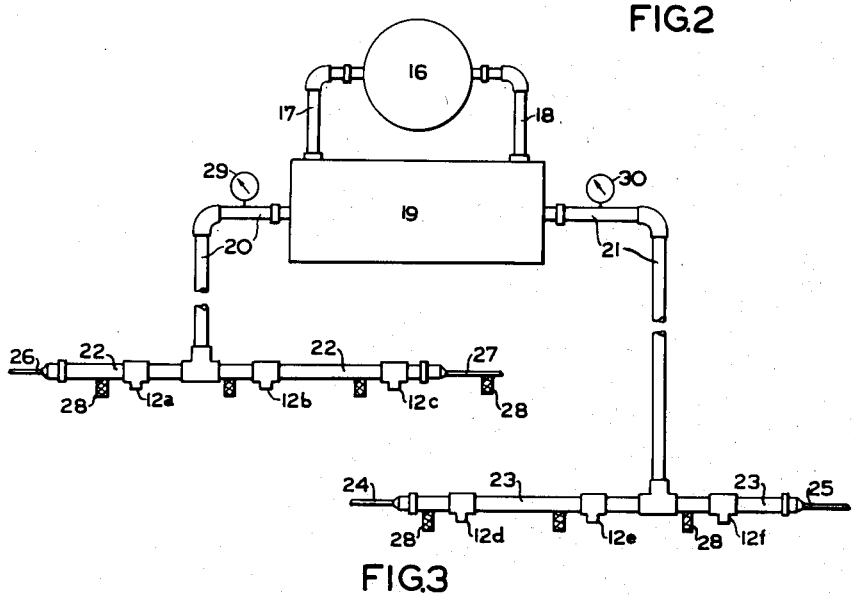
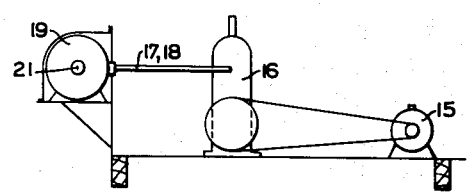

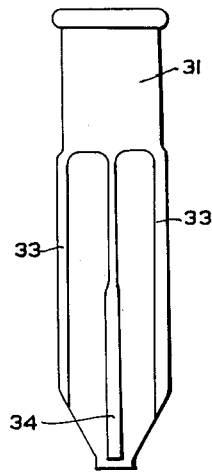
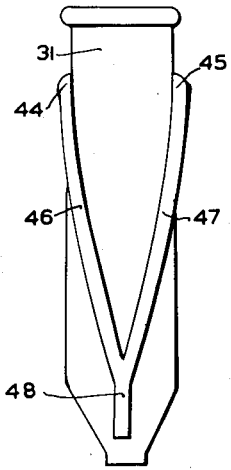
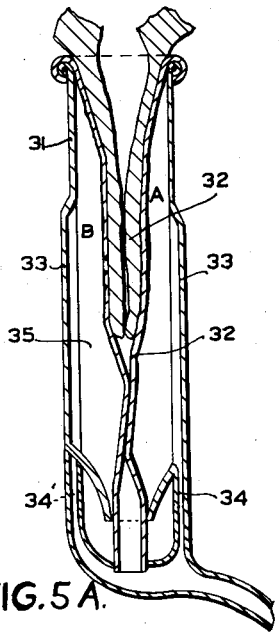
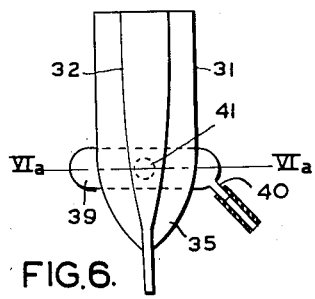
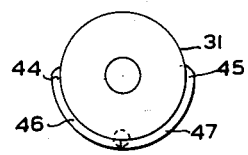
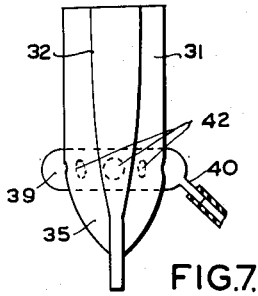
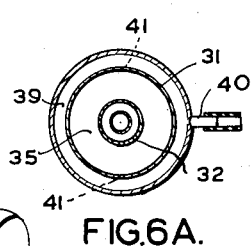
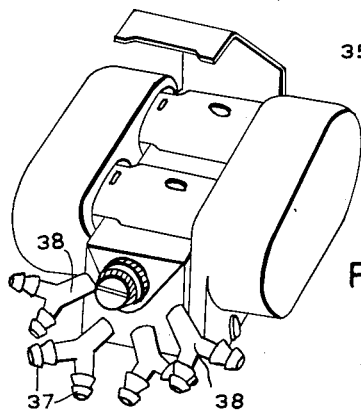
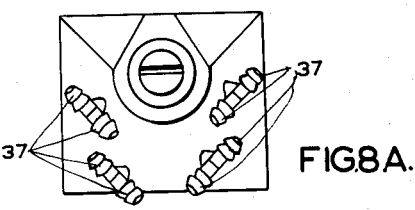

2,712,298

METHOD OF MILKING BY HIGH VACUUM

Anne Bajema, Gaast, Netherlands, assignor, by direct and mesne assignments, to N. V. "Ahex," Amsterdam, Netherlands, a company of the Netherlands Application July 21, 1950, Serial No. 175,205

Claims priority, application Netherlands July 22, 1949

5 Claims. (Cl. 119—14.02)

The invention relates to a method for using a milking machine for the pneumatic milking of cows by means of a vacuum applied to the teat-opening, to a device for the application of said method and to teat-holders for use with said method.

In general pneumatic milking devices are used, in which a teat-holder is pushed on each teat of the cow, said holder clamping the teat by means of a rubber nipple placed in the teat-holder, the lower end of this rubber nipple is connected to a rubber tube passing to the outside through the lower end of the teat-holder which is usually formed as a metallic cup, said tube being hermetically connected to a milk receptacle, wherein by means of a vacuum conduit a vacuum is maintained.

The vacuum conduit is connected to a pulsator which by means of a second tube is connected to the space between the rubber nipple and the metal cup, said pulsator alternately providing a vacuum in said space and admitting atmospheric air into said space. The closing muscle of the teat is opened by this pulsating action again and again, the milk being sucked from the milk space in the udder through the teat and the opening in the closing muscle and the rubber nipple into the milk-receptacle.

The milk receptacle is connected to a vacuum-conduit, wherein the vacuum is maintained by a pump via a vacuum-tank.

For these known pneumatic devices the admissible maximum value of the vacuum is always prescribed and people are warned not to use a higher vacuum. The pressure-gauge of the device is always provided with a red line, which must not be passed by the pointer. Moreover in such known devices the capacity of the vacuum-pump and of the motor driving said vacuum pump are so chosen, that the admissible vacuum can only be exceeded in exceptional cases, e. g. when only one milk-receptacle is used and only one holder is connected to a teat. Also the vacuum conduit is provided with a safety valve, opening when the prescribed vacuum is exceeded by some centimeters. When the valve is opened, air is sucked in through said valve so that the vacuum is decreased.

In practice the value of the vacuum prescribed for these known devices lies at half an atmosphere and in most cases a vacuum of exactly 35–36 cm. mercury vacuum pressure is prescribed, such values being prescribed for all known pneumatic devices after many years of observation and experience.

The choice of the value of the vacuum is connected with the formation of callosity in the teat. The usual vacuum for mechanical milking is lower than the vacuum which a calf can generate by suction, said last-named vacuum being about 45 cm. for a cow which is difficult to milk. The vacuum or the suction applied in the case of mechanical milking has intentionally been chosen lower in view of the bad influence due to the substitution of the natural process by a mechanical process.

Nevertheless these disadvantages have never been quite removed. The user of pneumatic milking machines gets many instructions from the manufacturer which he must follow in order to obtain good results. Nevertheless many users complain of the formation of callosity in the teats and the cows always must be milked out by hand to get a maximum production of milk.

The object of the invention is to remove the above mentioned disadvantages and to provide for a method increasing the effect of the known pneumatic milking machines, which has further advantages that will be described hereinafter. Further, the invention relates to a device for the application of the new method.

The method according to the invention is characterized by the use of a vacuum of at least 50 cm. of mercury and preferably more than 60 cm. of mercury is applied. In practice a vacuum of about 64 cm. has proved to be very useful.

Thus, contrary to the rules for pneumatic milking machines and contrary to the theory about pneumatical milking, according to the invention a vacuum is applied that is at least 50% higher than the maximum vacuum prescribed before and that is even 30 to 40% higher than the vacuum a calf can generate by suction.

It has been proved that this vacuum can be directly applied to a cow having teats which are free from callosity.

However, with a cow that has been mechanically milked over a long period and even with a cow not having been always milked by a first class handmilker, the method according to the invention is applied in such manner that first the usual vacuum is applied and this vacuum is increased by about 1 cm. every two or three days. In general the vacuum can be increased from 35 cm. to more than 60 cm. over a period of 3 to 4 weeks.

It is a surprising effect that there is no formation of callosity when a vacuum of more than 60 cm. according to the invention is regularly used, whereas according to the known practice callosity is formed with the usual vacuum of about 35 cm. Moreover, it has been proved that existing callosity will disappear after application of the method according to the invention.

It has been proved that the cows can endure this high vacuum for many years without any bad effect on their health. Moreover, it has been proved that the production of milk and the fat content in the milk become larger. The average money value of the milk in a year, inclusive of the higher value of the higher fat content, can exceed the average value obtained by a milking machine used according to the method prescribed by the manufacturer 25–30%.

For a stable of 42 cows the average fat content during the year from May 1948 to May 1949 has been about 4.18% with application of the method of the invention.

A further advantage of the method according to the invention is that the cow can be totally milked out very fast. For a short period the inner organism of the cow can strongly cooperate when the milk is delivered as the cow exercises an inner pressure on the udder, i. e. she "wants to get rid" of the milk as soon as possible. It is obvious, that the high vacuum cooperates in using this period in the correct manner, so that the milk with the larger fat content, which heretofore is obtained only when the cow is totally milked out, is obtained during the period in which the inner gland pressure cooperates for this production.

Neither is it necessary any longer to follow the usual instructions which complicate the use of a pneumatic milking machine, namely to remove the two teat-holders from the fore-quarters of the udder first and to continue milking for some time at the back-quarters. Such instructions have been given because the fore-quarters are emptied first and suction applied to teats in which there is no "milk cushion" has been considered as dangerous with regard to the formation of callosity in the teats.

This "callosity" is a fast growing tissue formed in the interior of the teat and is caused by the unnatural treatment of the teat. The callosity probably causes a decrease in the production of milk and in the fat content, because it blocks the passage in the udder to the teat-canal and the teat-canal itself.

The surprisingly good effect of the invention with regard to the formation of callosity may be explained by the fact that this formation is caused more by an insufficient adaption of the discharge of milk from the teat to the internal gland pressure than by the friction of the walls of the teat-canal against each other without the presence of a milk cushion.

The costs of depreciation, maintenance and energy for milking machines are such that for most farmers their use is profitable only when milk production is not decreased. Moreover, the cow must be milked within the time available between the milking periods.

This is of the greatest importance in obtaining a large milk production and the necessity of milking out requires milkers to be used in order to milk within such periods. However, upon a small reduction in time for milking out each cow, milkers are not needed.

As, according to the invention the milk production is also much increased, the sale of pneumatic milking machines is stimulated.

Moreover, the invention relates to the construction of teat-holders suitable for use in carrying out the method according to the invention which are improved with regard to the known teat-holders which are usually made of metal.

In using pneumatic milking machines, it is usual to push a teat-cup on the teat of the cow, said cup clamping the teat by means of a teat-lining of rubber placed inside the cup. Hereinafter the assembly of teat-lining and teat-cup will be designated as a "teat-holder." The teat-lining is connected to a vacuum conduit via the milk-receptacle. This vacuum conduit is also connected to the space between the teat-cup and the teat-lining via a pulsator and a tube, the said space being alternately connected to the vacuum conduit and to the atmosphere. The pulsating action thus obtained milks the cow.

In known constructions of the teat-holders the pulsator is connected to said space only via one opening.

The teat-holder of the invention is characterized by a construction in which the space between the teat-cup and the teat-lining is connected to the pulsator via at least two openings, preferably lying diametrically opposed to each other.

This construction has the surprising effect that a better milk-production is obtained and that the teats remain in a better condition, which probably can be explained as follows:

When there is one opening in the teat-cup, the teat-lining will be moved from the center during each pulsation owing to the unsymmetrically working forces, so that the closing muscle of the teat will not be opened in the right manner. The teat-lining will touch the wall of the cup again and again, causing an undesirable irritation of the outer side of the teat and thereby the dreaded formation of callosity, the wit the formation of a tissue adversely affecting milk production primarily by preventing the supple action of the closing muscle.

Of course this movement of the teat-lining is stronger the greater the difference between the pressures causing the pulsation.

With the teat-holder according to the invention the forces working on the teat-lining are divided in such a manner that the teat-lining remains substantially in the center of the teat-cup whereby the disadvantages mentioned above are avoided.

The invention will now be further described with the aid of the drawing and special attention will be paid to the device for applying the method according to the invention, and some embodiments of teat-holders preferably used in carrying out the invention will be described.

Fig. 1 is a side view of a milk-receptacle which for purposes of simplification has only the connection to two teat-holders.

Fig. 2 shows an enlarged view of a teat-holder in longitudinal section.

Fig. 3 shows schematically a vacuum plant for the application of the invention.

Fig. 4 shows the corresponding side view of the pump plant on a smaller scale.

Fig. 5 is a front view of a teat-holder of known construction;

Fig. 5A is a longitudinal view of the construction of Fig. 5, showing in dotted lines an embodiment of the improved construction according to the invention.

Fig. 6 shows schematically a section of another embodiment of a teat-holder according to the invention.

Fig. 6A is a section taken along the line VIa—VIa in Fig. 6.

Fig. 7 shows a modified construction of the device illustrated in Fig. 6.

Fig. 8 is a perspective view of an embodiment of a pulsator for application to teat-holders as shown in Figs. 5 and 5A.

Fig. 8A is a front view of this pulsator, showing the placing of the nipples.

Fig. 9 is a side view of another embodiment of a teat-holder according to the invention; and Fig. 9A is a top view of the embodiment of Fig. 9.

In Fig. 1 the milk receptacle 1 is closed by an air-tight cover 2, said cover showing the connection of two of the four short suction tubes 3 and 4 connecting the receptacle 1 to the teat-holders 5 and 6 pushed on the teats. These teat-holders are provided with a metal teat-cup 7 with a rubber nipple 8 inside the cup, as especially shown in Fig. 2. The rubber suction tubes 3 and 4 can be short, e. g. about 10 cm., because the milk-receptacle is directly suspended under the udder by means of a band 9 placed on the back of the cow. The choice of this known device out of several other known types of milking receptacles is of importance for the application of the invention, as this device facilitates the maintenance of a continuous and high vacuum as a result of the limitation of the air volume between the milk-receptacle and the rubber nipple. A pulsator 10 is placed on the cover 2, the rubber vacuum tube being connected to the pulsator at 11, said tube connecting the milk receptacle 1 with one of the nozzles 12a, 12b, etc. of the fixed tube (Fig. 3). Conduits 13 and 14, respectively, are connected to the teat-holders 5 and 6.

As shown in Fig. 2, the pulsator tube is connected to the space 14' between the rubber nipple 8 and the wall 7 of the cup. By means of the pulsator the space 14' is alternately connected to the vacuum and to the atmosphere, e. g. 40 times a minute. At each pulsation the rubber nipple presses on the closing muscle of the teat, so that the teat-canal is opened and the milk is sucked from the teat by means of the vacuum in the tube 3.

Now the capacity of the vacuum installation must be sufficiently large that the air repeatedly entering the space 14' and the conduits, between the pulsator and the teat-holder is sucked off sufficiently that the influence of the pulsator on the vacuum in the milk-receptacle is hardly perceptible and in the receptacle itself a vacuum of more than 60 cm. is always maintained.

In order to be able to endure this vacuum, the normal milk-receptacle, calculated for about 36 cm. vacuum, must be strengthened. Especially the bottom must be made stronger or must be provided with ribs.

In order to assure a sufficiently fast exhaust of the air, the rubber tubes 11 to each milk receptacle must be wider than usual. Still more important is the construction of the fixed part of the vacuum installation.

Fig. 4 shows that an electromotor 15 of e. g. 1.5 H. P. drives a vacuum pump 16 connected to both sides of a vacuum tank 19 by means of the suction conduits 17 and 18. These conduits must be sufficiently large e. g.

5 cm., for this capacity. Conduits 20 and 21 (Fig. 3) connected to the ends of the vacuum tank 19 and also with a diameter of about 5 cm., connect the tank with the two tubes 22 and 23 at both sides of the lines running the entire length of the stable.

The pipes 22 and 23 have about the same diameter as the tubes 20 and 21. At their ends, at about 3 cm. from the connections to the tubes 20 and 21, they are connected to thin tubes 24, 25, 26, 27 of e. g. 3 cm. diameter, by means of reducing nipples. If desired such a reduction in the diameter of the pipes may be repeated along the length of the stable.

In this manner, in the middle of the tubes, where the largest air volume must pass, the resistance of the suction is reduced and the total volume of air is made as small as possible by reducing the diameter of the tubes at the ends. By these means the maintenance of this high vacuum at the milking place is facilitated, so that it has the desired value at once when the teats are connected and the use of energy is kept as low as possible.

A transportable installation can of course be constructed in a similar manner, wherein the metal tubes are replaced by rubber tubes.

The connecting nipples are indicated by 12a—12f, said nipples being equally divided over the length of the parallel conduits 22—23 at a distance from each other corresponding with the distance of the stands of the cows, which in Figure 3 are indicated by blocks 28.

The conduits 20 and 21 are provided with manometers 29 and 30 having a warning signal for a vacuum of 64 cm. mercury.

When, with certain cows, the applied vacuum must be increased at certain intervals, this can be controlled by placing an intermediate tube provided with a control-valve and a pressure gauge between the vacuum tube 11 to the milk receptacle and the connecting nipple 12 to the conduit 22 or 23.

With the device according to the invention it is possible to reduce the time for milking a cow to about 2 minutes and to obtain the advantages mentioned above of larger milk production, higher fat content of the milk and a better condition of the teats of the cow.

In Figures 5 and 5A the usual teat-cup is indicated by 31 and the teat-lining by 32. The teat-cup, which is usually made of plate metal, but may be made of a material such as polystyrene, is provided with hollow ribs 33 forming a reinforcement of the wall, but also serving to conduct the variations of the pressure more rapidly to the upper part of the cup.

The hollow ribs are used to provide a nipple 34 for receiving a rubber tube connecting the space 35 between the walls of the teat-cup 31 and the teat-lining 32 with the vacuum via the pulsator.

Figure 5A shows the teat-holder during the part of the pulsator-stroke when the outer air is supplied in the space 35 between the walls of the teat-cup 31 and the teat-lining 32.

The teat 32' is then compressed by the teat-lining 32. In view of the position of the inlet 34, this pressure is first applied to the lower end of the teat and thus the teat is gradually compressed in an upward direction. When, according to the invention, a second inlet 34' is provided opposite the opening 34 the variations in the pressure are symmetrically applied at both sides of the teat, so that the advantages described hereinbefore will be obtained. A rubber tube can now be pushed on each of the connecting nipples 34 and 34' and both tubes can be connected to the corresponding nipple 38 of the pulsator, each nipple having two branches 37.

According to Figures 8 and 8A, all the nipples for the four teat-holders are constructed in this manner and they are placed in such a way that the pushing on of the rubber tubes can be easily effected.

It is also possible to use the usual nipples of the pulsator and to branch the tube, but this measure is not preferred in view of the problem of cleaning. Moreover, it is possible to unite both connections 34 and 34' of the teat-holders themselves into a branch-pipe.

Fig. 6 shows another embodiment according to the invention. In this construction the teat-cup 31 is surrounded by an annular chamber 39 connected to the pulsator by means of a nipple 40.

The space 35 communicates with the chamber 39 and, by means of the openings 41, with the pulsator. These openings 41 are placed opposite each other and are placed at right angles with regard to the nipple 40 (Fig. 6A). By reason of this construction, the teat-lining is influenced at two points opposite each other and by equal forces, so that the teat-lining remains in the center of the teat-cup 31.

As shown in Figure 7, it is also possible to provide the annular chamber 39 with a plurality of holes 42, preferably increasing in diameter away from the connecting nipple. The chamber 39 may be constructed as a ring which is open at its inner side and which can be pushed or screwed into the teat-cup 31 from below, so that it can be dismounted easily for cleaning purposes.

It is obvious, that the openings in the wall of the teat-cup may be placed higher than indicated in the embodiments described above. In some milking-machines it is usual to connect the pulsator to the upper part of the teat-cup, the teat-lining then being first compressed to the upper part of the teat and then gradually to the lower part, corresponding with the action a good milker exercises with his fingers.

In Figures 9 and 9A still another embodiment of a teat-holder according to the invention is shown in side view and top view, respectively, with the usual form of the cup 31 having a connection 43 for the pulsator conduit (shown in dotted lines) in the upper part. According to the invention this connection is replaced by two connections 44 and 45 diametrically opposed to each other and horizontally opening into the cup 31 and forming part of two small tubes 46 and 47, the inner diameter of each of these tubes being about the diameter of the mouth-piece 43, said tubes being led along the wall of the teat-cup and being united near the narrower part thereof to a connecting piece 48 having a diameter of about double the inner diameter of the mouth-piece 43. Figure 9A shows that the tubes 46 and 47 do not make the teat-holder much more voluminous as the mouth-piece lies under the larger upper part of the teat-holder.

I claim:
1. A method of milking cows mechanically which comprises applying a vacuum to the teat openings of the cows of at least 600 mm. of mercury.
2. A method of milking cows mechanically as defined in claim 1 wherein a vacuum of about 640 mm. of mercury is employed.
3. A method of milking cows mechanically by means of a teat cup having a flexible lining which comprises applying sub-atmospheric pressure to the inside of the flexible lining of the teat cup surrounding the teat of the cow and applying alternately atmospheric and sub-atmospheric pressures to the space between said lining and the inside of the casing of the teat cup surrounding said lining, said sub-atmospheric pressure being a vacuum of at least 600 mm. of mercury.
4. A method of milking cows mechanically by means of a teat cup having a flexible lining which comprises applying alternately atmospheric and sub-atmospheric pressures to the space between said lining and the inside of the casing of the teat cup surrounding said lining, said sub-atmospheric pressure being a vacuum of at least 600 mm. of mercury, while simultaneously applying said vacuum of at least 600 mm. of mercury to the teat openings of the cows.
5. A method as defined in claim 4 wherein said vacuum is about 640 mm. of mercury.

(References on following page)

References Cited in the file of this patent

UNITED STATES PATENTS

| Number | Name | Date |
|---|---|---|
| 766,845 | Sharples | Aug. 9, 1904 |
| 929,764 | Hoover | Aug. 3, 1909 |
| 974,834 | Sharples | Nov. 8, 1910 |
| 1,043,013 | Hulbert | Oct. 29, 1912 |
| 1,146,584 | Macartney | July 13, 1915 |
| 1,387,713 | Hewlett | Aug. 16, 1921 |
| 1,393,387 | McCornack | Oct. 11, 1921 |
| 1,471,394 | Frimand | Oct. 23, 1923 |
| 1,718,822 | Hulbert | June 25, 1929 |
| 1,916,839 | Hulbert | July 4, 1933 |
| 2,009,399 | Hapgood | July 30, 1935 |
| 2,050,356 | McCornack | Aug. 11, 1936 |
| 2,079,435 | Dinesen | May 4, 1937 |
| 2,334,481 | Silveira | Nov. 16, 1943 |
| 2,484,696 | Dinesen | Oct. 11, 1949 |